United States Patent [19]

Clayton et al.

[11] 3,923,787
[45] Dec. 2, 1975

[54] α-PHOSPHINIMINE PENICILLINS AND THEIR PREPARATION

[75] Inventors: John Peter Clayton, Horsham; Ronald Hubbard, Dorking, both of England

[73] Assignee: Beecham Group Limited, England

[22] Filed: July 5, 1973

[21] Appl. No.: 376,271

[30] Foreign Application Priority Data
July 13, 1972 United Kingdom.............. 32919/72

[52] U.S. Cl.............................. 260/239.1; 424/271
[51] Int. Cl.²....................................... C07D 499/02
[58] Field of Search................................. 260/239.1

[56] References Cited
UNITED STATES PATENTS

| | | | |
|---|---|---|---|
| 3,144,444 | 8/1964 | Coe et al. | 260/239.1 |
| 3,558,601 | 1/1971 | Ekström et al. | 260/239.1 |

*Primary Examiner*—Nicholas S. Rizzo

[57] ABSTRACT

α-Phosphinimine penicillins in acid, salt and ester form active against Gram-positive and Gram-negative bacteria and their preparation from azidocillin triethylamine salt and a triphenylphosphine. Representative compounds are D-α-dimethylphenylphosphiniminobenzylpenicillin and D-α-tri(n-butyl)phosphiniminobenzylpenicillin.

9 Claims, No Drawings

α-PHOSPHINIMINE PENICILLINS AND THEIR PREPARATION

This invention relates to a new class of substituted penicillanic acids and esters thereof which show activity against a wide range of Gram-positive and Gram-negative organisms, including penicillinase producing staphylococcal species. These compounds are therefore of value in the treatment of bacterial infections in animals, including man and poultry and as additives for animal and poultry feeds. The invention also relates to a process for the preparation of such compounds According to the present invention there is provided a compound of formula (I):

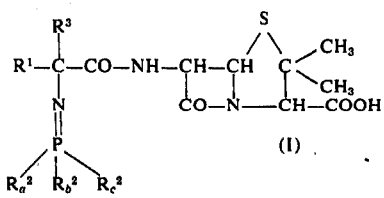

or a pharmaceutically acceptable salt or ester thereof wherein $R^1$ represents hydrogen or a $C_{1-7}$ alkyl, $C_{3-7}$ cycloalkyl, $C_{5-7}$ cycloalkenyl, phenyl, substituted phenyl, phenylalkyl having from 1 to 3 carbon atoms in the alkyl component or a monocyclic 5 or 6 membered heterocyclic group. $R^3$ represents hydrogen or, together with $R^1$ and the carbon atom to which they are joined form a $C_{5-7}$ cycloalkyl ring; $R_a^2$, $R_b^2$ and $R_c^2$ are the same or different and each is a substituted or unsubstituted alkyl, alkoxy, or alkylthio group, substituted or unsubstituted phenyl, phenoxy or phenylthio group, a substituted or unsubstituted phenylalkyl, phenylalkoxy or phenylalkylthio group, or a substituted amino group.

The group $R^1$ in formula (I) may be, for example hydrogen, phenyl, 4-hydroxyphenyl, 3,4-dihydroxyphenyl, 3-chloro-4-hydroxyphenyl, 3- or 4-methylphenyl, 3-methyl-4-hydroxyphenyl, 3,5-dimethyl-4-hydroxyphenyl, methyl, ethyl, n- or iso- propyl, n-, sec- or tert-butyl, cyclopropyl, cyclobutyl, cyclopentyl or cyclohexyl, cyclohexenyl, cyclohexadienyl, 2- or 3- thienyl, pyridyl or thiacyclohexyl. Of these, $R^1$ is preferably, phenyl, cyclohexadienyl or 4-hydroxyphenyl. When $R^3$ and $R^1$ taken together with the carbon atom to which they are joined form a cycloalkyl ring, the ring is preferably cyclohexyl.

When $R_a^2$, $R_b^2$ and $R_c^2$ are independently a substituted alkyl, alkoxy, or alkylthio group, suitable substituents may be halogen, cyano, hydroxy, amino, alkylamino, carboxylic acid or esterified carboxylic acid groups. These substituents may also be present when $R_a^2$, $R_b^2$ and $R_c^2$ are independently substituted phenyl, phenoxy, or phenylthio groups or phenylalkyl, phenylalkoxy or phenylalkylthio groups. When they are substituted amino groups, suitable substituents include lower alkyl, benzyl or phenyl groups. Specific examples of groups $R_a^2$, $R_b^2$ and $R_c^2$ include phenyl, methyl, ethyl, n- and iso-propyl, n-, sec- and tert-butyl, cyclohexyl, n-octyl, p-tolyl, p-methoxyphenyl, 2-cyanoethyl, ethoxy, ethylthio and dimethylamino.

The salts of compounds of formula (I) may be, for example, non-toxic metallic salts such as sodium, potassium, calcium and aluminium, ammonium and substituted ammonium salts, e.g. salts of such non-toxic amines as trialkylamines, including triethylamine, procaine, dibenzylamine, N-benzyl-betaphenethylamine, 1-ephenamine, N, N'-dibenzylethylene-diamine, dehydroabietylamine, N, N'-bis-dehydroabietylethylenediamine, and other amines which have been used to form salts with benzylpenicillin.

The esters of compounds of formula (I) may be simple alkyl esters, e.g. methyl, ethyl, esters, aralkyl esters e.g. benzyl ester, substituted alkyl esters, e.g. 2, 2, 2,-trichloroethyl ester or more complex esters which are readily hydrolysable in the human body to release the parent penicillanic acid. Examples of this latter class of esters include acyloxymethyl and acyloxy (substituted methyl) esters, e.g. acetoxymethyl, acetoxymethylmethyl, pivaloyloxymethyl and pivaloyloxymethyl esters and also "lactone esters" of the general formula (II)

wherein $R^3$ may be hydrogen or an alkyl, aryl or aralkyl group and Z represents a divalent radical e.g. $-CH_2-$, $-C_2H_4-$, $-C_2H_2-$, 1,2-phenylene or a 1,2-phenylene radical carrying substituents in the phenyl ring such as halogen, alkoxy or alkyl substituents.

The compounds of this invention may be prepared by reacting a compound of formula (III):

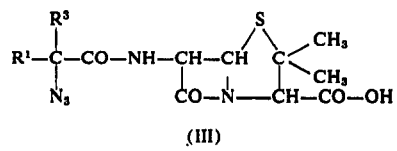

or a salt or ester thereof with a phosphine compound of formula (IV):

in which formulae $R^1$ and $R_a^2$, $R_b^2$ and $R_c^2$ are as defined with respect to formula (I).

The compounds of formula (I) are readily hydrolysed in the presence of water under both acid and alkaline conditions to give the parent α-aminopenicillin. This hydrolysis is not instantaneous however, and it is believed that the compounds of formula (I) are antibacterially active in their own right, having in many cases activity against β-lactamase producing bacteria. It will be clear that the compounds of this invention contain a potentially asymmetric carbon atom in the side chain. This invention includes the D and L epimers of such compounds as well as mixtures thereof. In general the D epimer is preferred for its higher activity.

Because compounds (I) are hydrolysed, the reaction of compound (III) with phosphine (IV) is best carried out under substantially anhydrous conditions. However, since the rate of hydrolysis varies from compound to compound, it is possible in some instances to tolerate the presence of some water.

The following Examples illustrate this invention:

EXAMPLE 1 a. Azidocillin triethylamine salt

The potassium salt of azidocillin (5.79g.) was dissolved in water (30 ml.) and stirred vigorously with an equal volume of dichloromethane. The pH of the mixture was adjusted to 1.5 using 5N hydrochloric acid, the layers then separated, the aqueous phase washed with dichloromethane (30 ml.), and the combined dichloromethane extracts washed with saturated brine solution (25 ml). The dichloromethane solution was then dried over anhydrous magnesium sulphate and filtered to give a solution of azidocillin free acid in dichloromethane.

This solution was cooled to 0°–5° and dry triethylamine (1.95 ml.) was added dropwise with stirring for 20–30 minutes to give a solution of azidocillin triethylamine salt. Evaporation of the solvent gave the solid triethylamine salt.

b. D-α-Triphenylphosphiniminobenzylpenicillin triethylamine salt

To the cooled (0°–5°) solution of azidocillin triethylamine salt prepared in 1 (a) was added a solution of triphenylphosphine (3.67g.) in dry dichloromethane (10 ml.). The reaction mixture was stirred at room temperature for 2 hours, nitrogen was evolved, and the solution was evaporated to dryness in vacuo to give a pale yellow solid which was washed with sodium-dried ether (2×50 ml.), and then dried in vacuo over fresh phorphorus pentoxide to give the required penicillin (8.03g., 80.7 percent). This material when subjected to paper chromatography gave an $R_f$ value of 0.80 (in butanol:ethanol:water) and 0.86 (in butanol:acetic acid:water) and gave a hydroxylamine colorimetric assay of 68 percent (calculated as the free acid). Infrared and n.m.r. data were quite consistent and indicated the presence of 0.3 mole equivalents of triethylamine.

Infrared (K Br) β-lactam C=O 1770 cm$^{-1}$. N.m.r. γ[(CD$_3$)$_2$SO+D$_2$O]2.29 (15H, broad doublet, PPh$_3$), 2.66 (5H, singlet, side-chain Ph), 4.65 (2H, AB pattern, J$_{AB}$ 3.8 Hz., β-lactam protons), 5.03 (H, doublet 14.5 Hz., side-chain CH), 5.97 (, singlet, C$_3$ proton), 8.48, 8.54 (6H, singlets, penicillin CH$_3$ groups).

c. D-α-Triphenylphosphiniminobenzylpenicillin

Azidocillin triethylamine salt (4.76g.) was taken and reacted with triphenylphosphine (3.93g.) as in Example 1 (b) for 20 hr. at room temperature. The dichloromethane was then evaporated in vacuo to give the crude triethylamine salt. This solid was stirred successively with sodium-dried anhydrous ether (4×500 ml.) for 2-3 hrs. each time and gave the required penicillin free acid (5.05g., 71 percent) as a white solid. This penicillin when subjected to paper chromatography gave an $R_f$ value of 0.79 (in butanol:ethanol:water) and 0.87 (in butanol:acetic acid:water) and gave a hydroxylamine colorimetric assay of 88 percent. Infrared and n.m.r. data were quite consisten: Infrared (CH$_2$Cl$_2$ soln) β-lactam C=O, 1780 cm$^{-1}$. N.m.r. γ[(CD$_3$)$_2$SO+D$_2$O] 2.32 (15H, broad doublet, PPh$_3$), 2.70 (5H, broad, side-chain Ph), 4.66 (2H, broad, β-lactam protons), 5.05 (H, doublet, 14.5 Hz., side-chain CH), 5.95 (H, singlet, C$_3$ proton), 8.54, 8.60 (6H, singlets, penicillin CH$_3$ groups).

EXAMPLE 2

D-α-Dimethylphenylphosphiniminobenzylpenicillin

Azidocillin triethylamine salt (7.62g.) was dissolved in dry dichloromethane (80 ml.) and the solution cooled to 0° whilst nitrogen was slowly passed over the liquid. Dimethylphenylphosphine (2.4g.) in dry dichloromethane (20 ml.) was added dropwise over a period of 30 min. to the stirred cooled azidopenicillin solution. Nitrogen gas was evolved and the reaction mixture allowed to warm up to room temperature. After 2 hr. reaction time a white solid crystallised out and after 3¾ hr. was filtered off and dried in vacuo over fresh phosphorus pentoxide giving the desired penicillin as a white crystalline solid (3.2g.).

The mother liquor was evaporated in vacuo to give an orange foam (5.32g.) which was then crystallised from dry dichloromethane with seeding and cooling to give a further crop (1.22g., total yield 57 percent). The white crystalline solid was identified as D-α-Dimethylphenylphosphiniminobenzylpenicillin m.p. 163° (sharp) having consistent infrared ($\nu_{C=O}$ 1770 cm$^{-1}$ β-lactam) and n.m.r. spectra [γ (D$_2$O)] 2.18 (5H, broad complex, phosphorus phenyl group), 2.59 (5H, broad singlet, α-phenyl group) 4.58 (2H, AB quartet, J$_{AB}$ 4 Hz., β-lactam protons), 5.03 (H, doublet, J 9.3 Hz., α-CH), 5.79 (H, singlet, C$_3$ proton), 7.67 and 7.78 (6H, two doublets, J$_{p-Me}$ 13.6 Hz., phosphorus methyl groups) and 8.52 (6H, broad singlet, gem-dimethyl protons).

This material when subjected to paper chromatography gave R$_f$ values of 0.48 (B/E/W) and 0.86 (B/A/W) and gave a hydroxylamine colorimetric assay of 130 percent.

EXAMPLE 3

D-α-Triethylphosphiniminobenzylpenicillin

Azidocillin triethylamine salt (7.62g.) was dissolved in dry dichloromethane (50 ml.) and the solution cooled to −15° whilst passing a slow stream of nitrogen over it. Triethylphosphine (2.05g.) in dry dichloromethane (20 ml.) was added dropwise over a period of 15 min. and the solution allowed to warm up to room temperature. Nitrogen evolution was observed and after 2½ hr. a solid crystallised out. After 6 hr. the white solid was filtered off, washed with dry dichloromethane (50 ml.) and dried in vacuo over fresh phosphorus pentoxide.

The white crystalline solid was identified as D-α-triethylphosphiniminobenzylpenicillin [2.13g., 29%, m.p. 170° (sharp)] having consistent infrared ($\nu_{C=O}$ 1770 cm$^{-1}$, β-lactam) and n.m.r. spectra [γ (D$_2$O)] 2.51 (5H, broad singlet, phenyl), 4.51 (2H, singlet, β-lactam protons), 4.92 (H, doublet, J 9.2 Hz., α-CH), 5.77 (H, singlet, C$_3$ proton), 7.64 and 7.84 (6H, two quartets J 7.5 and 12.3 Hz., CH$_2$ protons), 8.49 (3H, singlet, penicillin CH$_3$ group), 8.53 (3H, singlet, penicillin CH$_3$ group), 8.70 and 9.03 (9H, two triplets, J 7.5 and 19.5 Hz., CH$_3$ groups of the ethyl groups).

This material when subjected to paper chromatography gave R$_f$ values of 0.46 (B/E/W) and (B/A/W) and gave a hydroxylamine colorimetric assay of 107 percent.

EXAMPLE 4

D-α-Tri(n-butyl)phosphiniminobenzylpenicillin

Azidocillin triethylamine salt (2.9g.) was dissolved in dry dichloromethane (20 ml.) and the solution cooled in an ice-bath whilst passing a slow stream of nitrogen over it. Tri-n-butylphosphine (1.23g.) in dry dichloromethane (20 ml.) was added dropwise to the stirred solution over a period of 10 minutes and the solution allowed to warm up to room temperature. Nitrogen evolution was observed and after 18 hr. at room temperature the reaction mixture was evaporated in vacuo to give a pale yellow-brown solid which was thoroughly washed by successive stirring with sodium-dried anhydrous ether (3×70 ml., 15 min., 15 min., 1 hr.). The cream solid was then filtered, washed with dry ether and dried in vacuo over fresh phosphorus pentoxide and identified as D-α-tri(n-butyl)phosphiniminobenzylpenicillin(3.04g., 91 percent) having consistent infrared ($\nu_{C=O}$ 1765 cm$^{-1}$ β-lactam) and n.m.r. spectra [(CD$_3$)$_2$SO+D$_2$O] 2.57 (5H, broad, phenyl), 4.61 (2H, singlet, β-lactam), 5.0 (H, broad doublet, α-CH), 5.95 (H, singlet, C$_3$ proton), 7.8-8.8 (24H, v. broad complex, penicillin methyl groups and butyl CH$_2$ groups), and 9.03-9.30 (9H, v. broad, butyl CH$_3$ groups.

This material when subjected to paper chromatography gave R$_f$ values of 0.85 (B/E/W) and gave 0.93 (B/A/W) and gave a hydroxylamine assay of 94 percent.

EXAMPLE 5

D-α-Tri(p-tolyl)phosphiniminobenzylpenicillin

Reaction of azidocillin triethylamine salt (1.5g.) and tri(p-tolyl) phospine (1.05g.) in a similar manner to that in Example 4 gave an almost white solid identified as the required penicillin (1.45g., 71 percent yield) having consistent infrared ($\nu_{C=O}$ 1770 cm$^{-1}$ β-lactam) and n.m.r. spectra [(CD$_3$)$_2$SO] 0.85 (H, broad, NH), 2.55 (17H, v. broad, aromatic protons), 4.6 (2H, broad singlet, β-lactam protons), 5.12 (H, doublet, α-CH), 5.81 (H, singlet, C$_3$ proton), 7.62 (9H, broad singlet, aromatic CH$_3$ groups) and 8.52 (6H, broad singlet, penicillin methyl groups)].

This material when subjected to paper chromatography gave R$_f$ values of 0.95 (B/E/W) and 0.86 (B/A/W) and gave a hydroxylamine colorimetric assay of 85 percent.

EXAMPLE 6

D-α-Tri(p-methoxyphenyl)phosphiniminobenzylpenicillin

Reaction of azidocillin free acid [1.20g., see Example 1 (a)] and tri(p-methoxyphenyl)phosphine (1.25g.) for 25 hr, in a similar manner to that in Example 4 gave a pale yellow solid identified as the required penicillin (2.2g., quantitative) having consistent infrared ($\nu_{C=O}$ 1770 cm$^{-1}$ β-lactam) and n.m.r. spectra γ [(CD$_3$)$_2$SO+D$_2$O] 2.13-2.93 (17H, complex broad, aromatic protons), 4.67 (2H, singlet, β-lactam protons), 4 88 (H, doublet J 12.0 Hz, α-CH), 5.93 (10H, broad singlet, methoxy groups and C$_3$ proton), 8.50 (3H, singlet, penicillin CH$_3$ group) and 8.58 (3H, singlet, penicillin CH$_3$ group).

This material when subjected to paper chromatography gave R$_f$ values of 0.95 (B/E/W) and 0.89 (B/A/W) and gave a hydroxylamine colorimetric assay of 68 percent.

EXAMPLE 7

D-αTri(m-tolyl)phosphiniminobenzylpenicillin

Reaction of azidocillin free acid [from the potassium salt (5.0g.) as in Example 1 (a)] and tri(m-tolyl)phosphine (3.11g.) for 2 hr. in a similar manner to Example 4 gave a pale yellow solid identified as the required penicillin (quantitative yield) having consistent infrared ($\nu_{C=O}$ 1780 cm$^{-1}$ β-lactam) and n.m.r. spectra γ[(CD$_3$)$_2$SO+D$_2$O] 2.45 (17H, broad complex, aromatic protons), 4.67 (2H, broad singlet, β-lactam protons), 4.91 (H, doublet, 12.0 Hz., side-chain CH), 5.95 (H, singlet, C$_3$ proton), 7.63 (9H, singlet, aromatic CH$_3$ groups), 8.52, 8.59 (6H, broad singlets, penicillin gem-dimethyl groups).

This penicillin when subjected to paper chromatography gave an R$_f$ value of 0.88 (B/E/W) and 0.91 (B/A/W) and gave a hydroxylamine colorimetric assay of 73 percent.

EXAMPLE 8

Pivaloyloxymethyl-D-α-triphenylphosphin-iminobenzylpenicillanate

Azidocillin pivaloyloxymethyl ester (0.75g,) and triphenylphosphinimine (0.39g.) were mixed in dry ether at 0°-5°, and allowed to stand at room temperature for 24 hr. The solvent was evaporated in vacuo to give the required penicillin ester (Yield quantitative) as a white foam. This penicillin when subjected to paper chromatography gave an R$_f$ value of 0.93 (B/E/W) and gave a hydroxylamine colorimetric assay of 91 percent. Infrared and n.m.r. data were quite consistent: Infrared (mull nujol) β-lactam C=O 1780 cm$^{-1}$. N.m.r. γ [(CDCl$_3$)] 2.55 (20H, very broad and complex, all phenyl groups), 4.15 (2H, AB pattern, β-lactam protons), 4.36 (2H, broad complex, CH$_2$ of ester group), 5.25 (H, doublet 23 Hz, side-chain CH), 5.48 (H, singlet, C$_3$ proton), 8.38, 8.48 (6H, singlets, penicillin CH$_3$ groups), 8.73 (9H, singlet, CMe$_3$ of ester group)].

EXAMPLE 9

Acetoxymethyl-D-α-triphenylphosphiniminobenzylpenicillanate

Freshly distilled bromomethyl acetate was reacted in dry dimethylformamide with the potassium salt of azidocillin for 20 hr. at room temperature. The reaction mixture was poured into ice/water and standard work gave the required azidopenicillin ester as a white gum. This material when subjected to paper chromatography gave R$_f$ values of 0.92 (B/E/W) and 0.90 (B/A/W).

The acetoxymethyl ester was reacted with an equivalent amount of triphenylphosphine in dry dichloromethane for 15 hr. at room temperature. Work-up gave acetoxymethyl-D-α-triphenylphosphiniminobenzylpenicillin as a light yellow foam (quantitative yield) having consisten infrared ($\nu_{C=O}$ 1760–80 cm$^{-1}$)· and n.m.r. spectra γ[(CD$_3$)$_2$SO] 0 75 (H, broad, NH proton), 2.3-2.9 (20H, v. broad complex, phenyl protons), 4.21 (2H, singlet, C$_3$ proton), 5.44 (H, doublet 21.3 Hz., α-CH proton), 7.93 (3H, singlet, ester CH$_3$ group), 8.43 (3H, singlet, penicillin CH$_3$ group) and 8.59 (3H, singlet, penicillin CH$_3$ group).

EXAMPLE 10

Benzyl-D-α-triphenylphosphiniminobenzylpenicillanate

Benzyl bromide (12.23 ml.) in dry dimethylformamide (15 ml.) was added over a period of 10 minutes to a suspension of azidocillin potassium salt (20.65g.) in dry dimethylformamide (50 ml.) at 0°. Further dimethylformamide (35 ml.) was added, the reaction mixture allowed to warm up to room temperature and stirred for 5 hr.

The reaction mixture was poured into ice/water (1250 ml.) and extracted with ethyl acetate (2×400 ml.). The ethyl acetate extracts were combined, washed successively with water (3×400 ml.), 2% sodium bicarbonate (2×400 ml.) and saturated brine (100 ml.) and dried over anhydrous magnesium sulphate. The ethyl acetate was then filtered and evaporated in vacuo to give benzyl D-α-azidobenzylpenicillanate as a yellow-brown oil [Yield quantitative, $\nu_{C=O}$ 1775 cm$^{-1}$ (β-lactam), $\nu N_3$ 2108 cm$^{-1}$].

This penicillin when subjected to paper chromatography had R$_f$ values of 0.88 (B/E/W) and 0.9 (B/A/W).

The benzyl ester was reacted overnight with 5 percent excess of triphenylphosphine in dry dichloromethane as described in Example 4. Filtration and evaporation gave the penicillin as a light yellow foam which was dissolved in the minimum of dry ether; dry ethyl acetate, 3:1 and added dropwise to petrol (40°–60°, 31.). This gave benzyl-D-αtriphenylphosphiniminobenzylpenicillanate as a light yellow solid (42 percent yield, m.p. 80°–86°) having consistent infrared ($\nu_{C=O}$ 1780 cm$^{-1}$, β-lactam) and n.m.r. spectra β (CDCl$_3$+D$_2$O, 2.2–2.95 (25H, v. broad complex, phenyl protons), 4.40 (2H, AB quartet J$_{AB}$ 4.1 Hz., β-lactam protons), 4.80 (2H, singlet, CH$_2$), 5.25 (H, doublet J 20.7 Hz., α-CH), 5.49 (H, singlet, C$_3$ proton), 8.45 (3H, singlet, penicillin CH$_3$ group) and 8.61 (3H, singlet, penicillin CH$_3$ group).

This material when subjected to paper chromatography gave R$_f$ values of 0.92 (B/E/W) and 0.93 (B/A/W) and gave hydroxylamine colorimetric assay of 84 percent.

EXAMPLE 11

D-α-Tri(isopropy)phosphiniminobenzylpenicillin

Reaction of azidocillin triethylamine salt (2.9g.) and tri-isopropylphosphine (0.97g.) for 22 hr. in a similar manner to that in Example 4, gave D-α-tri(isopropyl)-phosphiniminobenzylpenicillin as a pale yellow solid (2.60g, 84% yield) having consistent infrared ($\nu_{C=O}$ 1775 cm$^{-1}$ β-lactam) and n.m.r. spectra [(CD$_3$)$_2$SO+D$_2$O]
2.3–2.8 (5H, broad, phenyl), 2.53 (2H, broad, β-lactam), 5.6–5.9 (2H, broad complex, α-CH and C$_3$ proton), 7.1–7.9 (3H, broad multiplet, isopropyl CH protons), 8.3–8.9 (24H, v. broad complex, penicillin gem-dimethyl protons and isopropyl methyl groups, 15.8 and 6.9 Hz.).

This material when subjected to paper chromatography gave R$_f$ values of 0 77 (B/E/W) and 0.88 (B/A/W) and gave a hydroxylamine colorimetric assay of 70 percent.

EXAMPLE 12

D-α-Tri(2-cyanoethyl)phosphiniminobenzylpenicillin

Tri(2-cyanoethyl)phosphine (50% excess) in dry dimethylformamide was added to a solution of azidocillin triethylamine salt in dry dimethylformamide at 0° and allowed to stand for 20 hr. at room temperature. Work-up involving pouring into anhydrous ether, filtration, and extensive washing with acetonitrile gave a cream coloured solid identified as the required penicillin (39 percent yield) by infrared ($\nu_{C=O}$ 1770 cm$^{-1}$ β-lactam) and n.m.r. spectra [(CD$_3$)$_2$SO] 0.18 (H, broad, NH), 2.62 (5H, broad singlet, phenyl protons), 4.63 (2H, broad singlet, C$_3$ proton), 6.84–8.14 (12H, v. broad, CH$_2$ protons), 8.44 (3H, broad singlet, penicillin CH$_3$ group) and 8.56 (3H, broad singlet, penicillin CH$_3$ group).

The penicillin when subjected to paper chromatography gave R$_f$ values of 0.21 (B/E/W) and 0.76 (B/A/W) and gave a hydroxylamine assay of 93 percent.

EXAMPLE 13

D-α-Tri(n-octyl)phosphiniminobenzylpenicillin

Azidocillin free acid (5.0g.) freshly prepared as in 1 (a) was reacted with tri-n-octylphosphine (5.2g.) in dry dichloromethane for 2 hr. in a similar manner to that described in Example 4. Work-up gave a pale yellow solid identified as the required penicillin (61 percent yield) having consistent infrared ($\nu_{C=O}$ 1780 cm$^{-1}$ β-lactam) and n.m.r. spectra [(CD$_3$)$_2$SO] 2.6 (5H, broad, phenyl group), 4.6 (.6 (2H, broad, β-lactam protons), 5.33 (H, doublet 9 Hz., side-chain CH), 5.87 (H, singlet, C$_3$ proton), 8.7 (48H, v. broad, CH$_2$ protons and penicillin gemdimethyl groups) and 9.06 (9H, broad, octyl CH$_3$ protons).

This penicillin when subjected to paper chromatography gave an R$_f$ value of 0.86 (B/A/W) and gave a hydroxylamine colorimetric assay of 85 percent.

EXAMPLE 14

D-α-Triethoxyphosphiniminobenzylpenicillin

Reaction of triethylphosphite (2.49g.) in dry dichloromethane with azidocillin triethylamine salt (4.76g.) at 0° gave, after stirring for 20 hr. at room temperature, a yellow gum on evaporation. The gum was dissolved in ethyl acetate and poured into sodium-dried ether to give a white solid identified as the required penicillin (21 percent yield) having consistent infrared ($\nu_{C=O}$ 1770cm$^{-1}$ β-lactam) and n.m.r. spectra [(CD$_3$)$_2$SO+D$_2$O] 2.61 (5H, broad singlet, phenyl protons), 4.57 (2H, AB quartet, 4 Hz., β-lactam protons), 5.0 (H, doublet, 9.6 Hz., α-CH proton), 5.86 (H, singlet, C$_3$ proton), 6.05 (6H, quartet, 7.2 Hz., CH$_2$ protons), 8.43 (3H, singlet, penicillin CH$_3$ group), and 8.83 (9H, triplet, 7.2 Hz., CH$_3$ protons of ethyl groups).

This penicillin when subjected to paper chromatography gave R$_f$ values of 0.56 (B/E/W) and 0.86 (B/A/W) and gave a hydroxylamine assay of 90 percent.

EXAMPLE 15

D-α-Tri(dimethylamino)phosphiniminobenzylpenicillin

Azidocillin triethylamine salt (4.76g.) was reacted at ca. 5° in dry dichloromethane with hexamethylphosphoroustriamide (1.63g.). The phosphorous triamide was added dropwise over 45 mins. and after 4.5 hr. at room temperature the reaction was worked up in a similar manner to Example 4. This gave a pale yellow solid identified as the required penicillin (93 percent yield) by infrared ($\nu_{C=O}$ 1770 cm$^{-1}$ β-lactam) and n.m.r. spectra [(CD$_3$)$_2$SO] 2.0 (H. broad NH), 2.4–2.9 (5H, broad multoplet, phenyl protons), 4.23 (2H, AB quartet, 13.3 and 4.0 Hz., β-lactam protons), 5.1 (H, broad, α-CH proton), 5.76 (H, singlet, C$_3$ proton), 7.40 (18H, broad doublet, 10 Hz., methylamino protons), 8.52 (6H, v. broad, penicillin gem-dimethyl groups).

The penicillin when subjected to paper chromatography gave an R$_f$ value of 0.95 (B/A/W) and gave a hydroxylamine colorimetric assay of 90 percent.

EXAMPLE 16

Following the procedures set out in Example 2, but substituting the appropriate α-azido penicillin starting material, the following compounds are prepared:

D-α-Dimethylphenylphosphinimino-p-hydroxybenzylpenicillin

D-α-Dimethylphenylphosphinimino-1,4-cyclohexadienylmethylpenicillin

D-α-Dimethylphenylphosphinimino-3-thienylmethylpenicillin

D-α-Dimethylphenylphosphinimino-methylpenicillin

D-α-Dimethylphenylphosphinimino-isobutylpenicillin

D-α-Dimethylphenylphosphinimino-cyclohexylmethylpenicillin

D-1-Dimethylphenylphosphinimino-1-cyclohexylpenicillin

D-α-Dimethylphenylphosphinimino-3-pyridylmethylpenicillin.

EXAMPLE 17

Following the procedure set out in Example 3 but substituting the appropriate α-azido penicillin starting material the following compounds are prepared D-α-Triethylphosphinimino-p-hydroxybenzylpenicillin
D-α-Dimethylphenylphosphinimino-1,4-cyclohexadienylmethylpenicillin.
D-α-Dimethylphenylphosphinimino-3-Thienylmethylpenicillin.

We claim:
1. A process for the preparation of a penicillin of formula (I):

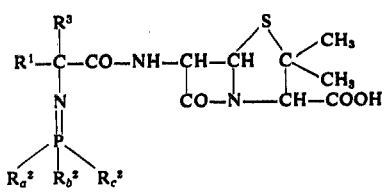

or a pharmaceutically acceptable salt or ester thereof, said ester being selected from the group consisting of lower alkanoyloxy-(lower alkyl), lower alkanoyloxy-(lower alkyl)(lower alkyl) and lactone esters of the formula (II):

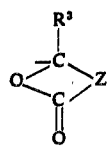

wherein
R$^3$ is hydrogen, and
Z is lower alkylene, lower alkynyl or 1,2-phenylene, unsubstituted or substituted in the phenyl ring by halo, lower alkoxy or lower alkyl,
said esters being readily hydrolyzable in vivo, wherein
R$^1$ is hydrogen, lower alkyl, cyclohexyl, phenyl, p-hydroxyphenyl, 1,4-cyclohexadienyl, 3-thienyl or 3-pyridyl;
R$^3$ is as above defined, or
R$^1$ and R$^3$ together with the carbon atom to which they are joined form a cyclohexyl ring; and
R$_a$$^2$, R$_b$$^2$ and R$_c$$^2$ are the same or different and each is methyl, ethyl, isopropyl, n-butyl, n-octyl, 2-cyanoethyl, ethoxy, dimethylamino, phenyl, p-methoxyphenyl, p-tolyl or m-tolyl, which comprises reacting a compound of formula (III):

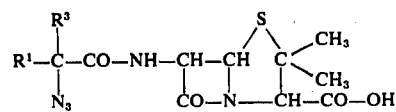

wherein R$^1$ and R$^3$ have the above meaning, or a salt or ester thereof as above defined, with a phosphine compound of the formula (IV):

in which R$_a$$^2$, R$_b$$^2$ and R$_c$$^2$ have the above meaning.

2. A process as claimed in claim 1 wherein the reaction is carried out in a substantially anhydrous solvent 3. A process as claimed in claim 1 wherein the configuration of the carbon atom to which the azido group is attached is D.

4. A penicillin of the formula (I):

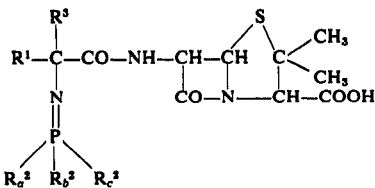

or a pharmaceutically acceptable salt or ester thereof, said ester being selected from the group consisting of lower alkanoyloxy(lower alkyl), lower alkanoyloxy(lower alkyl)(lower alkyl) and lactone esters of the formula (II):

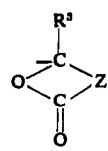

wherein
R$^3$ is hydrogen, and

Z is lower alkylene, lower alkynyl or 1,2-phenylene, unsubstituted or substituted in the phenyl ring by halo, lower alkoxy or lower alkyl, said esters being readily hydrolyzable in vivo, wherein
R¹ is hydrogen, lower alkyl, cyclohexyl, phenyl, p-hydroxyphenyl, 1,4-cyclohexadienyl, 3-thienyl or 3-pyridyl;
R³ is as above defined, or
R¹ and R³ together with the carbon atom to which they are joined form a cyclohexyl ring; and
$R_a^2$, $R_b^2$ and $R_c^2$ are the same or different and each is methyl, ethyl, isopropyl, n-butyl, n-octyl, 2-cyanoethyl, ethoxy, dimethylamino, phenyl, p-methoxyphenyl, p-tolyl or m-tolyl.

5. A penicillin, penicillin salt, or penicillin ester as claimed in claim 4 wherein R³ is hydrogen and R¹ is phenyl, cyclohexadienyl or 4-hydroxyphenyl.

6. A penicillin, penicillin salt or penicillin ester as claimed in claim 4 wherein R³ and R¹ taken together with the carbon atom to which they are attached form a cyclohexyl ring.

7. A penicillin, penicillin salt, or penicillin ester as claimed in claim 4 wherein $R_a^2$, $R_b^2$, $R_c^2$ are independently phenyl, methyl, ethyl, n- or isopropyl, n-, sec- or tert-butyl, cyclohexyl, n-octyl, p-tolyl, p-methoxyphenyl, 2-cyanoethyl, ethoxy, ethylthio or dimethylamino.

8. D-α-Dimethylphenylphosphiniminobenzyl-penicillin or a pharmaceutically acceptable salt or ester thereof, said ester being selected from the group consisting of lower alkanoyloxy(lower alkyl), lower alkanoyloxy-(lower alkyl)(lower alkyl) and lactone esters of the formula II:

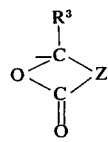

wherein
R³ is hydrogen, and
Z is lower alkylene, lower alkynyl or 1,2-phenylene, unsubstituted or substituted in the phenyl ring by halo, lower alkoxy or lower alkyl, said esters being readily hydrolyzable in vivo.

9. D-α-Tri(n-butyl)-phosphiniminobenzylpenicillin or a pharmaceutically acceptable salt or ester thereof, said ester being selected from the group consisting of lower alkanoyloxy(lower alkyl), lower alkanoyloxy(lower alkyl)(lower alkyl) and lactone esters of the formula (II):

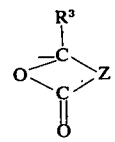

wherein
R³ is hydrogen, and
Z is lower alkylene, lower alkynyl or 1,2-phenylene, unsubstituted or substituted in the phenyl ring by halo, lower alkoxy or lower alkyl, said esters being readily hydrolyzable in vivo.

* * * * *